(No Model.) 2 Sheets—Sheet 1.
E. ARMANET.
APPARATUS FOR GENERATING ACETYLENE GAS.
No. 603,073. Patented Apr. 26, 1898.
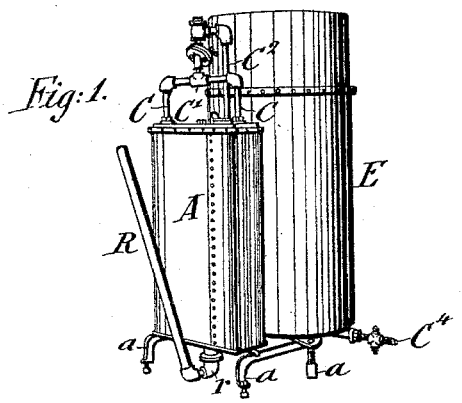
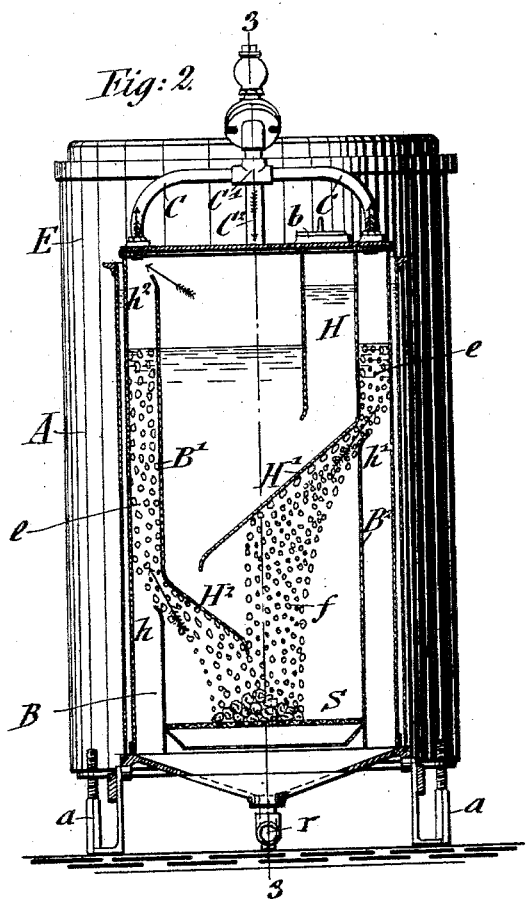
WITNESSES:
INVENTOR
Esteban Armanet
BY
ATTORNEYS.

(No Model.) 2 Sheets—Sheet 2.

E. ARMANET.
APPARATUS FOR GENERATING ACETYLENE GAS.

No. 603,073. Patented Apr. 26, 1898.

WITNESSES:
Geo. W. Jackel
Max Kurtzel

INVENTOR
Esteban Armanet
BY
Gowel & Raegener
ATTORNEYS.

UNITED STATES PATENT OFFICE.

ESTEBAN ARMANET, OF MEXICO, MEXICO.

APPARATUS FOR GENERATING ACETYLENE GAS.

SPECIFICATION forming part of Letters Patent No. 603,073, dated April 26, 1898.

Application filed August 18, 1897. Serial No. 648,624. (No model.) Patented in Mexico August 11, 1897, No. 1,069.

*To all whom it may concern:*

Be it known that I, ESTEBAN ARMANET, a citizen of the Republic of France, residing in the city of Mexico, in the Republic of Mexico, have invented certain new and useful Improvements in Apparatus for Generating Acetylene, (for which Letters Patent in Mexico were granted to me, No. 1,069, dated August 11, 1897,) of which the following is a specification.

This invention relates to an improved apparatus for generating acetylene by which the generation of the acetylene gas from the liquid is produced in an effective manner, so as to conduct it to a suitable gas-holder, and which, furthermore, permits the convenient charging of the generator with calcium carbid and water at any moment without detaching any portion of the apparatus and by which the calcium oxid produced by the calcium carbid can be drawn off; and the invention consists of an apparatus for generating acetylene which comprises a generator and a gas-holder connected with the generator, said generator being formed of an exterior vessel and an interior water-sealed bell-shaped vessel provided with a channel and inclined shelves for charging the calcium carbid to a tray at the bottom of the interior of the bell-shaped vessel, the outer vessel being provided with a tapering bottom and with a swivel discharge-pipe of the same height as the generator, so as to permit the ready discharge of the sediment from the bottom of the same.

Figure 3:
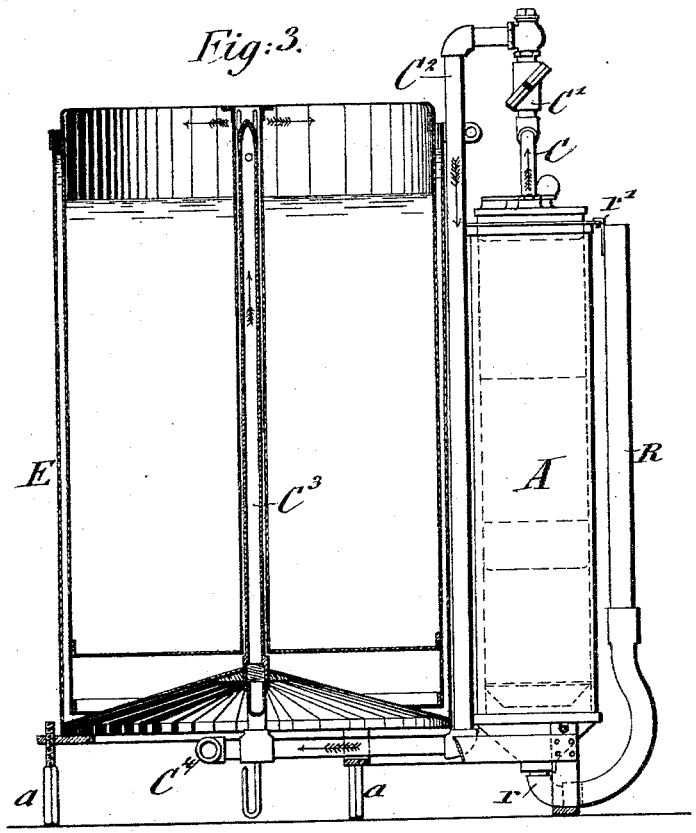
Figure 4:
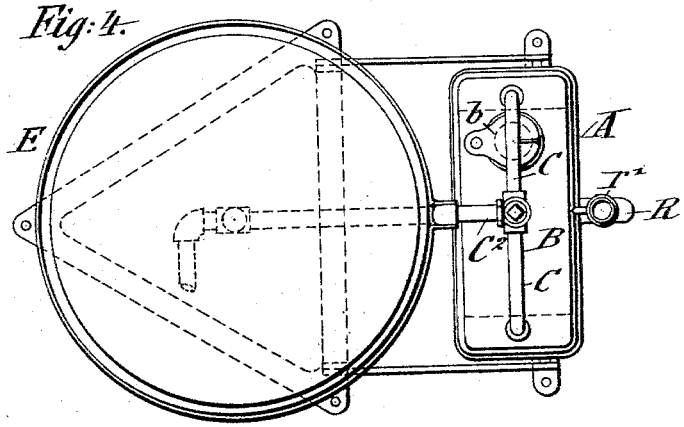

In the accompanying drawings, Figure 1 represents a perspective view of my improved apparatus for generating acetylene. Fig. 2 is a front elevation of the same, showing the generator in vertical longitudinal section. Fig. 3 is a vertical transverse section through the gas-holder on line 3 3, Fig. 2, the generator being in elevation; and Fig. 4 is a plan view of Fig. 3.

Similar letters of reference indicate corresponding parts.

Referring to the drawings, my improved apparatus for generating acetylene consists, first, of a gas-holder of the ordinary form and of a size proportioned to the quantity of gas to be required; second, of a generator for the gas which is made in various sizes, according to the quantity of gas to be generated for a certain purpose, and which is formed of an exterior vessel A, preferably made in oblong shape, but which can also be made square, cylindrical, or in any other shape. The generator is supported on legs $a$, provided with adjusting-screws, but it may also be supported in any approved manner on a suitable base. In the interior of the generator A is arranged an interior vessel B of bell shape, which has the same form as the exterior vessel A, but which is somewhat smaller than the same, so that it can be surrounded by a water seal and can rest easily in the exterior vessel without the least difficulty.

In the top of the interior vessel B is arranged a charging-orifice $b$, through which the calcium carbid is introduced, which is further connected by two tubes C C with a coupling C', which connects them with a valved pipe $C^2$, that extends along the side of the gas-holder to the bottom of the same and connects by a central pipe $C^3$, having orifices at its upper end, with the gas-holder E, of any approved construction, which gas-holder is likewise provided with small orifices near the central portion, through which the gas passes into the movable portion of the drum, so as to charge the same. The pipe $C^2$ is further connected by a pipe $C^4$ with the service-pipe of the building to be illuminated. Below the charging-orifice $b$ is arranged a tubular portion H, which extends into the water charged into the generator and which is open at the lower end, one side connecting with an inclined shelf H', along which the calcium carbid that is charged into the generator passes in downward direction onto a second shelf $H^2$, that extends from a transverse wall B' of the generator. A second transverse wall $B^2$ is arranged in line with the edge of the charging-tube H, orifices $h$ $h'$ $h^2$ being formed in the walls B' $B^2$, respectively, below the shelves H' $H^2$ and at the upper end of the left-hand wall B'. At the lower part of the space inclosed by the front and rear walls of the generator and the transverse wall B' is supported a screen S, on which the calcium carbid is collected when the same is dropped through the charging-opening into the generator. As soon as the carbid is charged the generation of the acetylene gas commences in the usual manner, the same escaping along the lower surface of the shelves H² H' and through the orifices h', h, and h² to the upper part of the interior bell-shaped vessel B and through the connecting-pipes C to the gas-holder, as shown by the arrows in Figs. 2 and 3. The interior vessel B is water-sealed, so that the same is supported in a perfectly tight manner, while no gas can escape. At the same time the parts can be readily taken apart whenever required for cleaning and repair.

The lower part of the exterior vessel A is made in inclined or dishing shape and connecting at its lower point with a discharge-pipe r, that is connected with a swiveled pipe R and which is made of such length as to correspond with the height of the generator and provided with a hook r' for being hung up on the outer supporting-band of the generator, as shown in Fig. 3. Whenever it is desired to discharge the lime-water formed in the lower part of the interior vessel of the generator, the pipe is placed in its lowermost position, so that the discharge of the water takes place either continuously when a large quantity of gas is required or intermittently when a smaller quantity of gas is necessary. When the discharge is continuous, it is necessary to charge through the opening a sufficient quantity of water and carbid, so that a generation of gas can be kept up continuously. In this case the discharge-pipe is inclined in downward direction, so that its orifice is below the discharge-orifice in the bottom of the generator, so that a continuous discharge of the liquid from the bottom of the generator takes place. When the discharge is to be intermittent, it is sufficient to incline the discharge-pipe sufficiently, so that it can discharge the water into a suitable vessel, after which a corresponding quantity of water, together with the carbid, is introduced into the generator and the discharge-pipe returned into its vertical position alongside of the generator. When the generator is to be operated, it is necessary to admit through the charging-opening a sufficient quantity of calcium-carbid, so as to produce a quantity of gas sufficient to charge the drum of the gas-holder, which usually should be sufficient for supplying the necessary gas, say, for a certain period of time, after which the sediment has to be drawn off in the manner described and the generator charged again with a proportionate quantity of water and carbid.

My improved generator can also be made on a smaller scale in direct connection with a stationary or movable gas-lamp, in which case, however, a comparatively small quantity of gas sufficient for feeding one burner is produced.

The advantages of my improved apparatus for generating acetylene gas can be attended to with great facility by any one, as there are no parts which have to be detached or handled with the exception of the cover of the charging-opening in the top of the generator and the discharge-pipe. In other respects the generation takes place automatically in a perfectly-reliable manner. The cleaning action is assisted by the weight of the column of water in the generator and the pressure of the gas above the water in the same.

Having thus described my invention, what I claim is—

1. In an apparatus for generating acetylene gas, a generator composed of an exterior vessel, an interior bell-shaped water-sealed vessel provided with transverse partitions having alternating inclined shelves at opposite sides, a charging-tube extending downwardly from the top of the bell-shaped vessel, a cover for said charging-tube, a screen-bottom between the transverse partitions and below the lower shelf, outlet-pipes at the upper part of the interior vessel and a discharge-pipe at the bottom of the exterior vessel, substantially as set forth.

2. In an apparatus for generating acetylene, a generator consisting of an exterior vessel having a dished bottom, an interior bell-shaped and water-sealed vessel provided with a charging-opening in its top part, transverse partitions in said interior vessel, alternating inclined shelves extending from opposite sides of said partitions one below the other, a charging-tube connecting the charging-opening with the upper shelf, a screen at the bottom of the interior vessel between the partitions, openings in said partitions below each shelf and at the upper end of said partition, substantially as set forth.

In testimony that I claim the foregoing as my invention I have signed my name in presence of two subscribing witnesses.

EBAN. ARMANET.

Witnesses:
J. SEGNEYRO,
GUSTAVO BINDSUL.